3,221,079
DIHYDROXY DIPHENYL SULFONE/FORMALDE-
HYDE CONDENSATES AS CURING AGENTS
FOR POLYVINYL ALCOHOL
Thomas G. Harris, East Hempfield Township, Lancaster
County, Pa., assignor to Armstrong Cork Company,
Lancaster, Pa., a corporation of Pennsylvania
No Drawing. Filed Apr. 12, 1961, Ser. No. 102,400
3 Claims. (C. 260—844)

This invention relates generally to polyvinyl alcohol compositions, and more particularly to curable polyvinyl alcohol compositions. Still more particularly, the invention relates to the curing of polyvinyl alcohol with a special curing or cross-linking agent in order to form tough, strong, cured products.

The polyvinyl alcohols are most generally prepared from polyvinyl acetates or other polyvinyl esters by replacement of the acetate or other ester groups by hydroxyl groups. One method utilized alcoholysis by reacting polyvinyl acetate in ethanol with potassium hydroxide. Another method utilizes polyvinyl propionate dissolved in ethanol to which is added with stirring a solution of potassium hydroxide in ethanol. The alcoholysis of polyvinyl acetate may be carried out in the presence of acid catalysts as well as alkaline catalysts. Use of acids, however, forms the polyvinyl alcohol more slowly and tends to give polyvinyl alcohol containing more ether linkages by splitting out water between two hydroxyl groups. The term "polyvinyl alcohol" has come to mean pure polyvinyl alcohols as well as the products of partial alcoholysis or hydrolysis but which contain a sufficient number of free hydroxyl groups to render the material soluble in water. This is the meaning of polyvinyl alcohol used in this specification.

The use of polyvinyl alcohols as protective films and coatings has been enhanced by various curing and cross-linking agents to render the polyvinyl alcohol water-insoluble. This insolubilization is also essential where the polyvinyl alcohol is used as an adhesive, possibly blended with such additional materials as starch and dextrin.

One of the excellent properties of a polyvinyl alcohol film is its impervious nature to gases. However, it has frequently been necessary to protect the polyvinyl alcohol film from solubility by water where the gas impervious property of polyvinyl alcohol was to be used in various applications. There is, therefore, a need for a method of curing or cross-linking polyvinyl alcohol in order to render the polyvinyl alcohol film or coating impervious to water while retaining the desirable property of being impervious to gases. At the same time it would be highly desirable if such curing or cross-linking could be accomplished in the absence of a catalyst in order to avoid in the film the presence of any agents which might deleteriously affect the substrate or other material in contact with the film. It is the primary object of the present invention to supply such a need.

The invention contemplates a curable composition comprising polyvinyl alcohol and the condensation product under alkaline conditions of formaldehyde and dihydroxy diphenyl sulfone.

The cross-linking or curing agent for polyvinyl alcohol contemplated by the present invention is the reaction product of formaldehyde with dihydroxy diphenyl sulfone, the reaction being carried out under alkaline conditions. The dihydroxy diphenyl sulfone has the formula

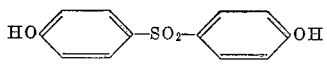

and condenses with formaldehyde in the same manner as do other bis-phenols. The dihydroxy diphenyl sulfone may be taken up in water containing sufficient sodium hydroxide or alkaline hydroxide to form the salt. This will entail the use of two mols of the alkali per mol of the sulfone. The formaldehyde is then added to the solution, preferably in the form of a water solution of formaldehyde. Four mols of formaldehyde can react with each mol of the dihydroxy diphenyl sulfone, and this amount, plus the usual slight excess, should be used. Enough water should be used to maintain the materials in water solution, although large amounts of excess water do not do any harm. The mixture should be heated, generally near reflux, and maintained at that temperature for a sufficient length of time to form the resin. Generally 1–10 hours will be used and preferably 5–7 hours. The exact molecular weight of the resulting resin does not appear to affect its action on polyvinyl alcohol.

At the completion of the period of reflux, the solution should be cooled to room temperature and acidified to a pH of about 6–7. If desired for the sake of purity, sodium bisulphite in an amount sufficient to scavenge any remaining free formaldehyde may be added. While the solution is being acidified, it may well be desirable to maintain the solution in a cool condition by the addition of ice. The resin may be filtered and dried, preferably under vacuum, to avoid fusion, and powdered. The resulting polysulfone powder may be admixed directly with the polyvinyl alcohol in an amount of 2–30% by weight of the resin based on the weight of the mixture of polyvinyl alcohol and the resin. Baked films formed of this composition are clear, tough, strong, impervious to water and gases, and generally superior to films of polyvinyl alcohol cross-linked with other agents.

The following examples illustrate several embodiments of the invention. All parts are by weight unless otherwise stated.

*Example 1*

Into a large flask were placed 250 parts (1 mol) dihydroxy diphenyl sulfone, 357 parts (4 mols plus 10% excess) formaldehyde in the form of a 37% solution in water, 80 parts (2 mols) sodium hydroxide flakes, and 720 parts of water. The mixture was refluxed for 6 hours. The temperature was approximately 200° F. After cooling to room temperature, the solution was acidified with 20% sulfuric acid to a pH of 6–7, room temperature being approximately maintained by the addition of ice. Prior to neutralization approximately 50 parts of sodium bisulphite was added to remove excess formaldehyde.

The solids were filtered from the solution, dried at room temperature, and powdered.

*Example 2*

Solutions of polyvinyl alcohol in methyl alcohol-water were prepared. To these solutions were added sufficient of the formaldehyde-dihydroxy diphenyl sulfone reaction product described in Example 1 to make up 10% by weight of the resin based on the weight of the polyvinyl alcohol and the resin. The solutions contain 10% solids.

Series of such solutions were made and cast into films followed by drying in air at room temperature, baking at 300° F. for one hour, and testing by immersing the resulting film in water.

The film made from 100% polyvinyl alcohol (Elvanol 52-22, 87.5% hydrolysis) with no added agents at all was clear and yellow in color. After 5 minutes in room temperature water the film curled. It dissolved after one hour.

A second film made up of 90% by weight polyvinyl alcohol (Elvanol 52–22) and 10% by weight of the reaction product of formaldehyde and 2,2-bis(4-hydroxyl phenyl) propane gave a clear off-white film which swells in water after one day.

A third film containing 90% by weight polyvinyl alcohol (Elvanol 52–22) and 10% by weight of the formaldehyde-dihydroxy diphenyl sulfone reaction product described in Example 1 was clear and off-white in color. There was no observable effect after water immersion for five days. Slight softening was noticed after one week of immersion.

I claim:
1. A curable composition comprising polyvinyl alcohol and from 2–30% by weight of the condensation product under alkaline conditions of 4 mols of formaldehyde per mol of dihydroxy diphenyl sulfone.
2. A cured and cross-linked composition comprising polyvinyl alcohol and from 2–30% by weight of the condensation product under alkaline conditions of 4 mols of formaldehyde per mol of dihydroxy diphenyl sulfone.
3. The method of curing polyvinyl alcohol which comprises admixing therewith from 2–30% by weight of the condensation product under alkaline conditions of 4 mols of formaldehyde per mol of dihydroxy diphenyl sulfone, and subjecting the mixture to sufficient heat to cause curing.

References Cited by the Examiner

UNITED STATES PATENTS

| | | | |
|---|---|---|---|
| 2,392,686 | 1/1946 | Murdock | 260—844 |
| 3,029,212 | 4/1962 | Lipowski et al. | 260—49 |

FOREIGN PATENTS

| | | |
|---|---|---|
| 464,022 | 3/1950 | Canada. |

OTHER REFERENCES

Carswell: Phenoplasts, Interscience, New York, 1947, TP 986 P4C3 (pages 9–10 relied on).

Du Pont de Nemours and Co.: "Elvanol," Wilmington, Del. (1953) (p. 34 relied on).

MURRAY TILLMAN, *Primary Examiner.*

WILLIAM H. SHORT, JAMES A. SEIDLECK,
*Examiners.*